Aug. 28, 1962 — W. F. HOMRIGHAUSEN — 3,051,425
TRIPOD WITH PLUMB
Filed Nov. 25, 1960 — 2 Sheets-Sheet 2
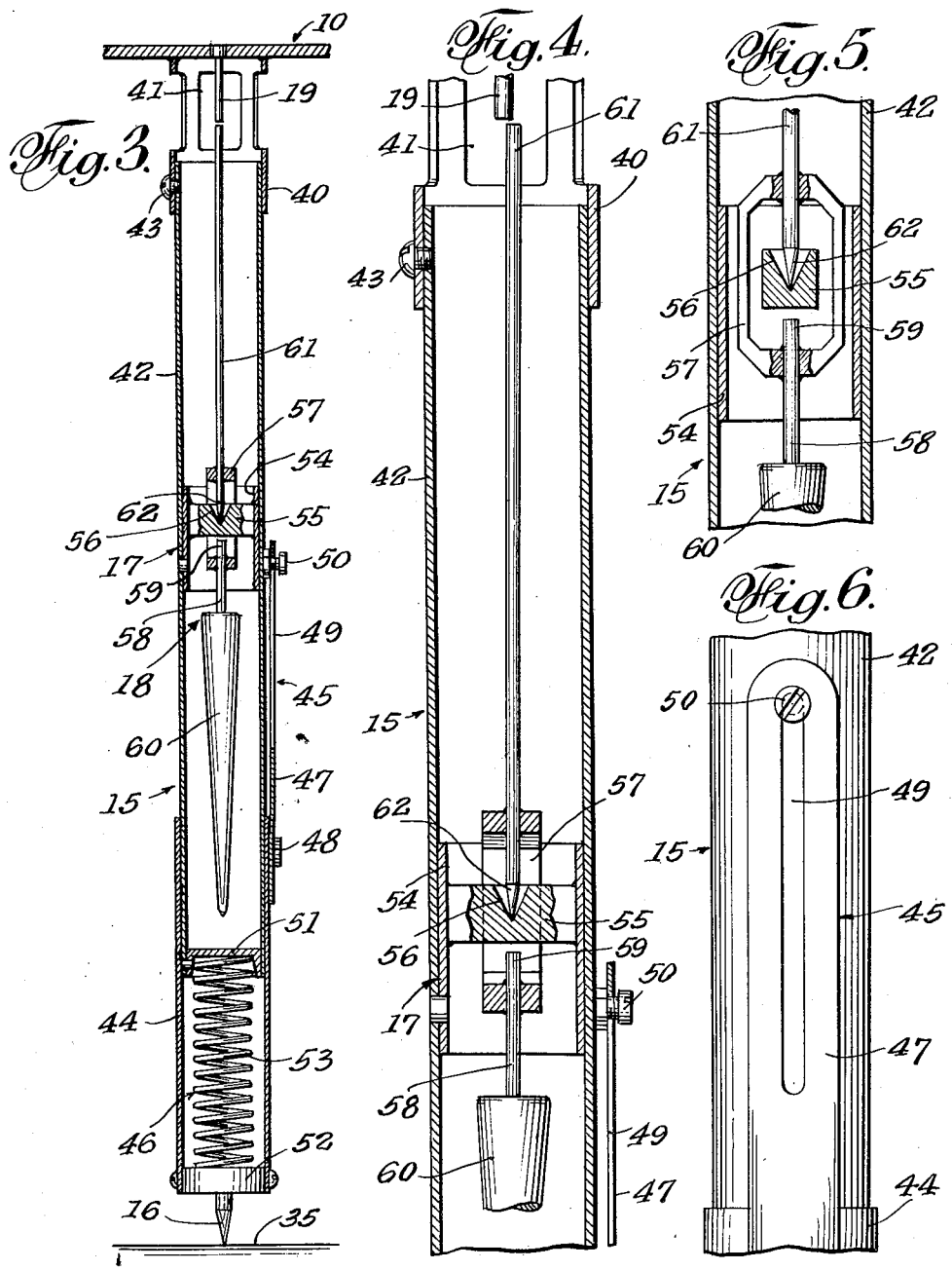
INVENTOR.
WILLIAM F. HOMRIGHAUSEN
BY C. J. Stratton
ATTORNEY

United States Patent Office 3,051,425
Patented Aug. 28, 1962

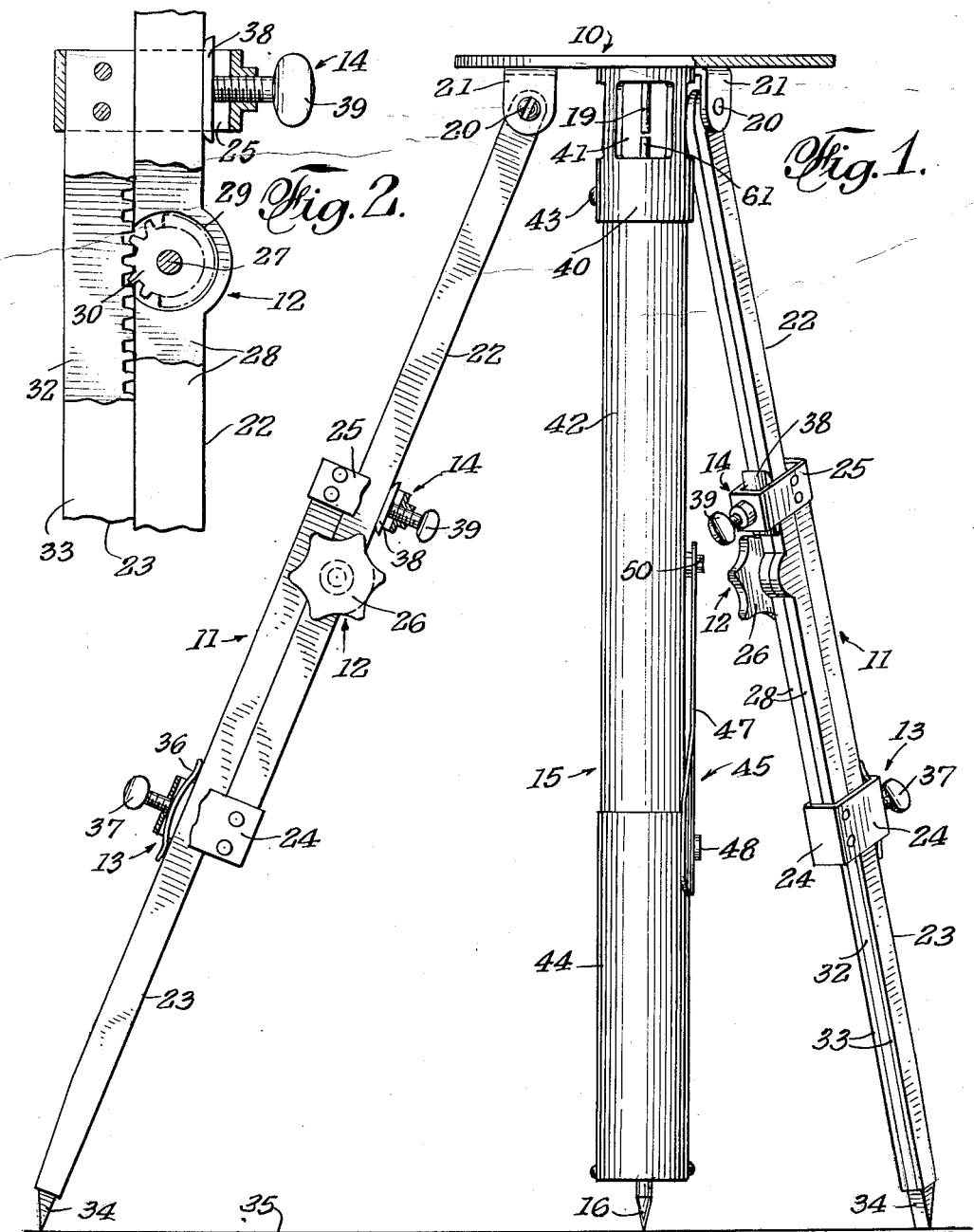

3,051,425
TRIPOD WITH PLUMB
William F. Homrighausen, 509 S. Orange Ave.,
Monterey Park, Calif.
Filed Nov. 25, 1960, Ser. No. 71,554
8 Claims. (Cl. 248—168)

This invention relates to a tripod with a built-in plumb and has for an object to provide apparatus of the type referred to that is adjustable by one operator to be set to a true vertical or plumb position.

Another object of the invention is to provide a tripod structure in which the plumb thereof is so built-in that the same is unitary, and is automatically in position, ready for adjustment of the tripod when said tripod is erected to plumb upon a mark.

A further object of the invention is to provide a tripod structure that may be set directly on a marker or stake so that leveling of the structure to a plumb position may be carried out while the structure is so oriented and, therefore, in an expeditious manner.

A still further object of the invention is to provide, in a tripod structure of the character above referred to, a novel plumb device that remains on the marker or stake during plumbing adjustment and the degree of plumb alignment being visably shown, not at said marker or stake, but at a more elevated location immediately below the base plate to which the tripod legs are connected.

A yet further object of the invention is to provide, in a tripod structure, novel means for adjusting the support legs thereof, whereby one person may carry out all needed adjustments.

This invention also has for its objects to provide such means that are positive in operation, convenient in use, easily installed in a working position and easily disconnected therefrom, economical of manufacture, relatively simple, and a general superiority and serviceability.

The invention also comprises novel details of construction and novel combinations and arrangements of parts, which will more fully appear in the course of the following description, which is based on the accompanying drawings. However, said drawings merely show, and the following description merely describes, one embodiment of the present invention, which is given by way of illustration or example only.

In the drawings, like reference characters designate similar parts in the several views.

FIG. 1 is a partial elevational and partial sectional view showing the present tripod with a built-in plumb.

FIG. 2 is an enlarged and fragmentary side view of means to adjust each of the three legs of the tripod.

FIG. 3 is a longitudinal sectional view showing the plumb and its enclosure.

FIG. 4 is an enlarged longitudinal sectional view showing the upper portion of FIG. 3 with the plumb enclosure in an out-of-plumb position and the manner of visually showing such position.

FIG. 5 is a fragmentary longitudinal view of the lower portion of FIG. 4 and taken in a plane transverse to the plane of section of FIG. 4.

FIG. 6 is a fragmentary elevational view showing an enlargement of means to non-rotationally connect telescoping portions of the plumb enclosure.

The present plumb structure comprises, generally, a support member or base plate 10, a set of three support legs 11 for said base plate, means 12 to adjust the length of each leg 11, means 13 imposing friction or drag to enable single operator control of leg adjustment, means 14 on each leg to lock the adjustment thereof, an enclosure 15 extending downwardly from the base plate 10 and terminating in a marker or stake point 16, a universally plumb mount 17 carried with the enclosure, a plumb 18 carried by the mount 17, and a central downwardly directed rod member 19 on the plate 10 within the enclosure 15 and so related to the plumb 18 that the degree of accuracy of plumbness of the latter may be read in connection with said member 19.

The base plate 10 may be of any desired form for supporting an instrument to be leveled. Transits, telescopes, etc. are examples of such an instrument. In a conventional manner, the legs 11 are each connected to said plate 10 on a pivot 20 and in the bifurcation of a lug 21 whereby the legs may be spread or folded together in the usual way.

Each leg 11 is shown as comprising a hinged leg section 22, and a slidable section 23 that may be extended, as shown, or contracted by the means 12. A strap 24 is affixed to the lower end of leg section 22 and encircles the leg section 23, and a strap 25 is affixed to the upper end of the leg section 23 and encircles the leg section 22.

The leg-adjusting means 12 comprises an adjusting knob 26 on a shaft 27 journalled in the leg section 22. The latter is preferably formed of two longitudinal members 28 with a recess 29 formed in the two-ply leg section to accommodate a pinion gear 30 that is affixed to shaft 27. Said gear is in mesh with rack teeth 31 provided along the edge of the middle member 32 of the leg section 23. Outer or cover members 33 enclose member 32 on both sides. It will be evident that rotation of knob 26 causes leg section 23 to be extended or retracted relative to leg section 22, according to the direction of knob rotation. A foot piece 34 is provided on the lower end of the leg section 23 and is formed to have non-slipping engagement with a surface 35 with which engaged.

The drag-imposing means 13 is carried by the mentioned strap 24 and is here shown as a spring shoe 36 that is engaged with an edge of the adjustable leg section 23, and a tension-imparting screw 37 threadedly mounted on strap 24 and so engaged with shoe 36 that the drag imposed thereby may be varied as desired. Thus, the leg sections may retain temporary adjustment which can be readily overcome by the means 12 when adjustment is being made.

The lock means 14 is carried by the mentioned strap 25 and is shown as a shoe 38 that is engaged with an edge of leg section 22, and a lock screw 39 threadedly mounted on strap 25 and impinged on shoe 38 so that, when said screw is fully taken up, the pressure exerted thereby on said shoe, effectively locks the leg sections 22 and 23 in their position of adjustment.

Since the knobs 26 and the wings of screws 37 and 39 may be easily reached by a person leveling the tripod while visually checking the level condition thereof, leveling is rapidly accomplished, since the stake point 16 need not be watched as the same, at all times, remains on its mark.

The enclosure 15 is preferably affixed to the exact middle of the base plate 10 or rather equi-distant from the three lugs 21, so that all three legs are spaced uniformly from the axis of said enclosure. Said enclosure comprises a collar 40 depending from plate 10 and having openings 41 therein to render the inside of said collar visible from the outside, an extension tube 42 depending from said collar and removably affixed thereto by one or more screws 43, a telescoping tube 44 at the lower end of tube 42, means 45 interconnecting tubes 42 and 44 to interconnect said tubes and hold the same relatively non-rotational, and means 46 biasing the tube 44 downwardly so that the stake point 16, carried by the latter tube, also, is biased downwardly.

The means 45 is shown as a member 47 affixed, as at 48, to the outside of tube 44 and extending upwardly along the outside of tube 42, said member 47 having a longitudinal slot 49, and a pin 50 engaged in said slot and carried by the tube 42. Thus, tube 44 is free to telescopically move relative to tube 42, but will not turn while so moving. Also, the means 45 retains the tube 44 against separation from tube 42.

The means 46 is shown as a plug 51 affixed to the lower end of tube 42, a plug 52 affixed to the lower end of tube 44, and an expansion spring 53 confined between said plugs. The stake point 10 extends from the plug 52.

It will be clear that, when setting up the tripod, whether on a mark or not, the point 16 is set on the surface 35 and the tripod remains centered on such point of engagement at all times during adjustment of the legs 11 to achieve a plumb position of the tripod.

The plumb mount 17 comprises a sleeve 54 fixedly positioned inside tube 42 intermediate its ends, and a bridge 55 spanning diametrally across said sleeve and provided with a conical seat 56.

The plumb 18 comprises a ring 57 loosely within said sleeve 54 and loosely encircling the bridge 55, a rod 58 extending downwardly from the ring 57 and having an upwardly directed extension 59 that terminates below and in spaced relation to the bridge 55, a plumb bob 60 rigidly carried by the rod 58 and depending therefrom, a second rod 61 extending upwardly from ring 57 and having a depending portion terminating in a conical point 62 that has bearing in seat 56. In this plumb bob structure, the pivot point between the seat in bridge 55 and the rod point 62 is preferably midway between the lower end of the bob 60 and the upper end of the rod 61.

Since the above-described bob is on the axis of the enclosure 15, as is the rod member 19, it will be evident that a true plumb position of the former will bring the rods 61 and 19 in accurate alignment as indicated in FIG. 3. Should the enclosure 15 and, therefore, the base plate 10, be in any position other than a truly plumbed position, said rods will be come misaligned, as in FIG. 4. The degree of misalignment will indicate the amount of deviation from the vertical of the enclosure 15 and will advise which of the legs 11 require adjustment.

Since the plumb condition of the tripod can be seen at a relatively elevated place—immediately below the base plate 10—the ease with which one person can manipulate the adjustment, is deemed to be clear. Also, the point 16 does not shift as is the case with the usual suspended plumbing means, thereby, further facilitating accurate set-up of the tripod.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A tripod structure comprising, in combination, a support member, three longitudinally adjustable legs hingedly connected to said member to support the same, a longitudinally telescopic enclosure depending from said member and rigidly connected therewith, a stake point on the lower end of said member, resilient means biasing said point toward the surface on which said legs are adapted to rest, a plumb within and mounted on the axis of the enclosure and having an upwardly directed rod, and a downwardly directed rod affixed to said support member on the same axis.

2. A tripod structure according to claim 1 in which said enclosure is provided with openings revealing the interior thereof, and said mentioned rods having their adjacent ends visible through said openings.

3. A tripod structure comprising, in combination, a support member, three longitudinally adjustable legs hingedly connected to said member to support the same, a longitudinally telescopic enclosure depending from said member and rigidly connected therewith, a stake point on the lower end of said member, resilient means biasing said point toward the surface on which said legs are adapted to rest, a sleeve affixed within said enclosure, a plumb device supported by said sleeve and comprising a depending bob and an upstanding rod, and a rod rigidly depending from the support member and terminating short of the upper end of the plumb rod, said plumb device and depending rod being coaxial.

4. A plumb device comprising a vertical enclosure having a fixed tube and a second tube telescopically fitted to the fixed tube, a spring biasing the second tube in a downward direction, a stake-engaging point on the lower end of the second tube, a fixed, downwardly directed rod in the upper end of the fixed tube, and a plumb device coaxial with said rod and carried by and within said enclosure.

5. A plumb device comprising a vertical enclosure having a fixed tube and a second tube telescopically fitted to the fixed tube, a spring biasing the second tube in a downward direction, a stake-engaging point on the lower end of the second tube, a fixed, downwardly directed rod in the upper end of the fixed tube, a support sleeve affixed to the inside of the enclosure and provided with a transverse bridge, and a plumb device gravitationally supported on said bridge coaxially with said rod and having an upwardly directed rod in plumb-determining relationship with the fixed rod.

6. A plumb device according to claim 5 in which the upper end of the fixed tube is provided with lateral openings, and the mentioned rods have their adjacent ends visible through said openings.

7. A device for supporting an instrument to be leveled comprising a support member, a plurality of adjustable legs adjustably connected to said member to support the same, a longitudinally telescopic enclosure depending from said member and rigidly connected therewith, a stake point on the lower end of said member, resilient means biasing said point toward the surface on which said legs are adapted to rest, a sleeve affixed within said enclosure, a plumb device supported by said sleeve and comprising a depending bob and an upstanding rod and a rod rigidly depending from the support member and terminating short of the upper end of the upstanding rod, said upstanding and depending rods being coaxial.

8. A device according to claim 7 in which an opening is provided in said vertical enclosure through which the adjacent ends of said upstanding rod and said depending rod are visible whereby and operator may adjust said legs to establish said support member in a level condition which is indicated by coaxial disposition of said adjacent ends as viewed through said opening.

References Cited in the file of this patent

UNITED STATES PATENTS

| 364,991 | Cross | June 14, 1887 |
| 2,698,537 | Taylor | Jan. 4, 1955 |
| 2,703,691 | Minnis | Mar. 8, 1955 |

FOREIGN PATENTS

| 1,394 | Great Britain | Jan. 24, 1891 |
| 122,156 | Great Britain | Jan. 6, 1919 |
| 289,091 | Switzerland | June 16, 1953 |
| 339,257 | Switzerland | Aug. 15, 1959 |